(12) United States Patent  (10) Patent No.: US 7,567,305 B2
Joo  (45) Date of Patent: Jul. 28, 2009

(54) METHOD FOR SELECTING PREFERENCE CHANNEL AND DIGITAL TV USING THE SAME

(75) Inventor: Young Sun Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 673 days.

(21) Appl. No.: 11/261,499

(22) Filed: Oct. 31, 2005

(65) Prior Publication Data

US 2006/0095938 A1    May 4, 2006

(30) Foreign Application Priority Data

Nov. 1, 2004    (KR)    .................... 10-2004-0087996

(51) Int. Cl.
H04N 5/45     (2006.01)
H04N 5/445    (2006.01)

(52) U.S. Cl. ........................ 348/731; 725/46
(58) Field of Classification Search ................. 348/731, 348/734, 563–565, 569, 906; 725/46, 44, 725/47, 9, 14
See application file for complete search history.

(56) References Cited

U.S. PATENT DOCUMENTS 5,315,392 A     5/1994  Ishikawa et al.
5,734,444 A *   3/1998  Yoshinobu .................... 725/14
6,084,644 A     7/2000  Atkinson et al.
6,118,498 A *   9/2000  Reitmeier .................... 348/725
6,538,704 B1 *  3/2003  Grabb et al. ................. 348/731
6,636,273 B1 * 10/2003  Weber ........................ 348/734
7,441,260 B1 * 10/2008  Kurapati ...................... 725/46
2002/0044226 A1  4/2002  Risi et al.
2003/0103088 A1 * 6/2003  Dresti et al. ................. 345/835
2004/0040039 A1  2/2004  Bernier et al.
2004/0086260 A1 * 5/2004  Kwak .......................... 386/46
2004/0221306 A1 * 11/2004 Noh ........................... 725/44

FOREIGN PATENT DOCUMENTS

EP    0 575 956 A2    12/1993
EP    1 187 468 A1     3/2002

* cited by examiner

Primary Examiner—Paulos M Natnael
(74) Attorney, Agent, or Firm—Birch, Stewart, Kolasch & Birch, LLP

(57) ABSTRACT

A method for selecting preference channels comprising the steps of initializing a digital TV(DTV) system to set an idle state of a general mode in which a channel is selected through multi-stage-input procedures; registering a preference channel set including at least one preference channel through which a user most-frequently watch DTV, the registered preference channels corresponding to specific keys, respectively; c) switching current general mode to a preference mode; and d) selecting one channel of the registered preference channel set through the one-touch input of the specific key corresponding to the one channel, in the switched preference mode.

20 Claims, 7 Drawing Sheets

- Prior Art -

METHOD FOR SELECTING PREFERENCE CHANNEL AND DIGITAL TV USING THE SAME

BACKGROUND OF THE INVENTION

1. Field of the Invention

The present invention relates to a digital TV (DTV), more particularly, a channel selection method used for a digital TV in which user's broadcast preference channels are previously recorded to corresponding keys of a remote controller so that the corresponding keys of the remote controller can be used for selecting preference channels after switching to preference channel selection mode, and a digital TV using the method.

2. Description of the Related Art

As TV technology has been developed from color TV to digital TV, TVs have tended to be remarkably advanced in their technology to higher definition, higher resolution and more multi-functions. Along with these advancements in DTV technology, there have been the pursuits of extreme convenience in selecting TV channels.

FIG. 1 is a structural view of a typical digital TV system according to a prior art.

Referring to FIG. 1, the digital TV system includes an antenna 100, a tuner 102, a demodulator 104, a demultiplexer 106, a decoder 108, a video encoder 110, an audio digital-analogue converter 112, a microprocessor 114, a SDRAM 116, a Flash ROM 118 and an EEPROM 120.

In the operation of the conventional DTV system, the antenna 100 receives and outputs a digital broadcast signal to the tuner 102 which then tunes the received signal. Next, the demodulator 104 receives and demodulates the tuned digital broadcast signal. The demodulated signal is divided into an image signal and an audio signal in the demultiplexer 106.

The divided signal is decoded into an original image and an original voice in the decoder 108. The decoded image is changed into a video format selected by the video encoder 110 to be displayed to the user, and the decoded voice is changed into an analogue signal in the audio digital-analogue converter 112 to be provided to the user.

In addition, the microprocessor 114 controls the whole system of the DTV. The SDRAM 116, the Flash ROM 118, and the EEPROM 120 store data and information and provide processing areas in the system.

In the conventional DTV system, there are three methods for changing channels as follows:

First, there is a method for sequentially changing channels using channel up/down keys of an input device. According to this method, the user should input sequentially channel keys times until a screen corresponding to the desired channel key appears in the DTV screens. In this conventional method, there is a disadvantage in that the user should perform key input operations several times to move to her/his desired channel in the multi-channel DTV system.

Second, there is a method for directly moving to a desired channel by inputting a channel number using a number key. According to this method, the user can directly move to a desirous channel. However, more keys than a number of channel ciphers for one channel change have to be inputted and this may cause an inconvenience. Further more, it is cumbersome to confirm whether or not the input key corresponds to the desired channel.

Third, there is a method for changing channels by moving/selecting a cursor in an OSD (On Screen Display) for providing channel change environment. This method has an advantage to directly change channels, but causes an inconvenience in that the user should input the OSD-enter-keys, direction keys and selection keys several times and a part of video currently displayed in DTV is overlapped with the OSD.

In addition to the above conventional techniques for selecting the desired channels, there is more improved art for changing channels in which the user can previously register preference channels in DTV system, and selects one of the previously-registered preference channels through the OSD by using direction keys and selection keys when watching on DTV. In strict sense, this method belongs to the above-mentioned third conventional method in light that there are still problems that keys are inputted several times and a part of video is overlapped by the OSD.

SUMMARY OF THE INVENTION

It is an object of the present invention to provide a method for selecting the desired preference channel in which the user's preference channels corresponding to the remote control keys respectively have been previously registered, and the user can select easily and conveniently the desired one of the previously-registered preference channels by inputting one remote key corresponding to the selected desired preference channel on the basis of one-touch scheme after turning on DTV and switching to a predetermined preference channel mode if desired.

In order to accomplish this object, according to one aspect of the present invention, there is provided a method for selecting preference channels including the steps of: a) initializing a digital TV(DTV) system to set an idle state of a general mode in which a channel is selected through multi-stage-input procedures; b) registering a preference channel set including at least one preference channel through which a user most-frequently watch DTV, the registered preference channels corresponding to specific keys, respectively; c) switching current general mode to a preference mode; and d) selecting one channel of the registered preference channel set through the one-touch input of the specific key corresponding to the one channel, in the switched preference mode.

According to another aspect of the present invention, there is provided a DTV system comprising: a DTV main portion for receiving digital broadcasting signals; and a wireless remote controller for interfacing a user with the DTV main portion through bi-directional wireless communication, wherein the DTV main portion comprises: a user input data receiver for receiving the user input data including the user's preference channel registration information from the wireless remote controller; an information storing unit for storing a general channel setting mode (a general mode information) and a preference channel setting mode (a preference mode information) wherein the general mode is for selecting a channel with a plurality of keys sequentially input, whereas the preference mode is for selecting a channel with one-touch key input; and a data transmitter for outputting the general mode information and the preference mode information; and an OSD display unit for providing options for selecting one the general mode and the preference and registering the preference channels, wherein at least one preference channel is registered as preference channel set through the preference mode in the manner that each channel of the registered preference channel set corresponds to each of the remote control keys, respectively, and wherein one channel of the registered preference channel set are selected with one-touch-input key corresponding to the selected one channel.

Preferably, the method or the DTV system further comprises a step or a means for assigning a broadcasting station's symbol or name corresponding to each channel of the registered preference channel set.

Preferably, in the method or the DTV system, the broadcasting station's symbol or name is represented on the remote controller, or the broadcasting station's symbol or name is represented on the OSD.

Preferably, in the method or the DTV system, the number of the preference channel set is plural.

Preferably, the method or the DTV system further comprises a step or a means for assigning a user's name or a channel function name with respect to each of a plurality of preference channel number sets, and the user's name or the channel function name is represented on the remote controller or on the OSD.

Still preferably, in the method and the DTV system, the registration of the preference channel set is performed on the OSD or through the remote controller.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter descriptions will be made in detail about the preferred embodiments of the present invention, which are illustrated in the accompanying drawings.

Figure 2:
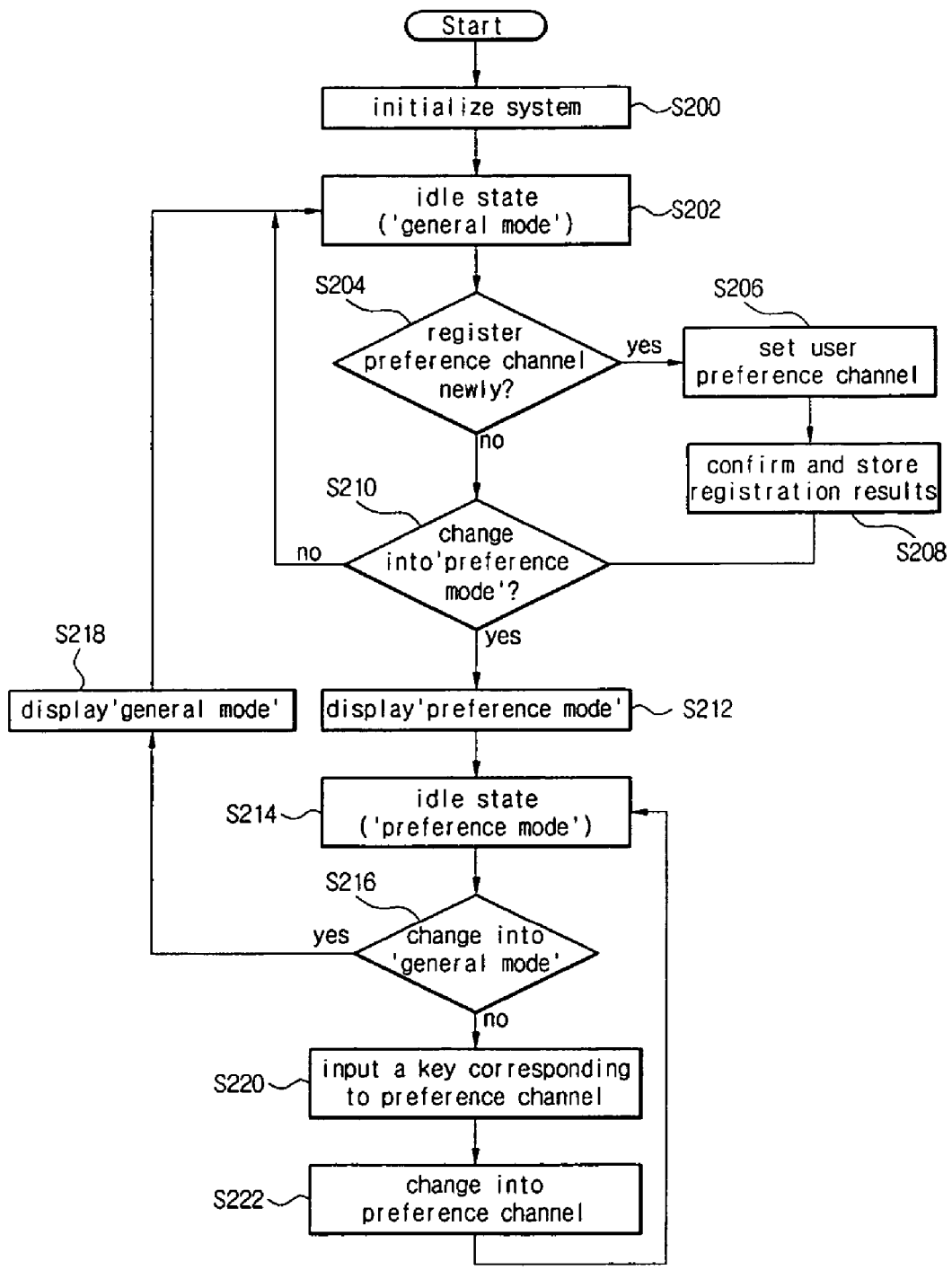
FIG. 2 is a flow chart illustrating a method for selecting a preference channel in accordance with an embodiment of the present invention.

FIG. 2 is a flow chart showing a method for selecting a preference channel according to one embodiment of the present invention.

Firstly, the DTV system of the present invention is powered on to then be initialized. (Step 200)

The system, which has been initialized, receives signals of the on-air channel to maintain an idle state in which image signals and audio signals are being output in real-time. (S202)

The idle state is in a "general mode" in which the keys of a remote controller have original functions intended for general purpose.

Next, it is determined if the user registers a new preference channel. (S204) According to the determination result, if the preference channel registration is determined by the user, the user sets a preference channel (S206) to confirm and store the registration results in DTV system. (S208)

The operation of registering the preference channel is a process for corresponding and recording desired preference channels to specific keys of an input device (for example, remote controller), respectively and this process can be performed whenever the user wants after the DTV system has been initialized.

In the process for corresponding and recording the desired channels to the specific keys, the user sets preference channels through an OSD or a combination of the remote controller keys. In case of performing the process through the OSD, the user may assign and record corresponding channel numbers or names to the registered specific keys of the remote controller based on attributes of the selected preference channels according to the user's tendency. Whereas, if preference channels are set by a combination of the remote controller keys, it is possible to perform a setting process more conveniently. For example, in order to set a current channel as a preference channel, a specific key corresponding to the current channel is pressed long to then finish all the setting process.

If all the setting process has been completed, then, the DTV system informs the results thereof to the user through the OSD, and the setting information is stored in a non-volatile memory.

Additionally, the DTV system may provide a setting environment in which the user can register several sets of preference channel groups in accordance with her/his own tastes.

However, if preference channels previously registered or stored in the step 204 exists, the DTV system determines if the user switches a 'general mode' into a 'preference mode' for easily selecting one of the previously registered preference channels. (S210)

The switching between a 'general mode' and a 'preference mode' can be made through a menu in the DTV system. For this process, a key for mode switching may be allotted to a remote controller of the DTV.

According to a determination result in the step S210, if the user does not want to change a current mode to a 'preference mode', the current mode is returned to an idle state of a 'general mode'. Whereas if the user wants to change a current mode to a 'preference mode', the current mode is displayed on the OSD so that the user clearly recognizes what is the current mode or the current mode may be displayed in a display panel of a remote controller in a certain graphic or on LED thereof. (S212)

In addition, the DTV system may provide a means for continuously indicating what the current state is in order to minimize users' confusion in key operating, like a conventional front panel of a DTV system.

In step S212, after the current mode is changed into a 'preference mode' by the user, the current mode is maintained in an idle state like the general mode (S214).

Next, it is determined if a current mode is changed or switched into a 'general mode' by the user (S216). If the user wants to change the current mode into a 'general mode', the current mode is displayed on a screen so that the user clearly recognizes what the current mode is, or the current mode is displayed in a display panel of a remote controller in a certain graphic or the equivalent (S218).

However, if the user does not want to change the current mode to the 'general mode' in step S216, the process goes from step S214 to steps 216 and 220. Then, unlike the idle state of step S218, the user can input only the key corresponding to the desired reference channel (S220) to easily and conveniently move the current channel to the user's desired preference channel (S222).

Figure 3:
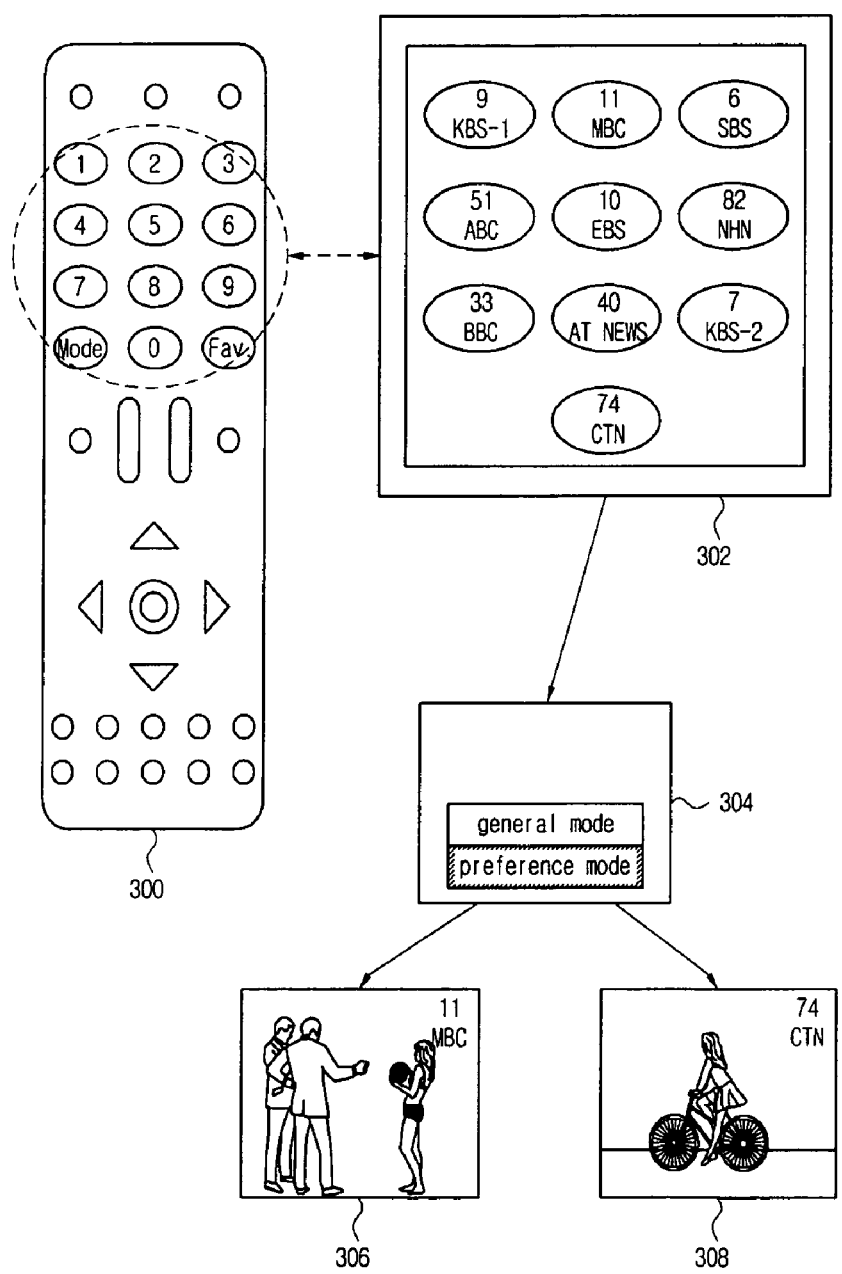
FIG. 3 illustrates an example of registering and using preference channels in accordance with an embodiment of the present invention.

FIG. 3 illustrates an example of registering and using preference channels in a DTV system in accordance with an embodiment of the present invention.

FIG. 3 illustrates a remote controller 300, a screen 302 which shows registered preference channels with corresponding keys allocated thereto for selecting them on OSD, a screen (304) in which the general mode has been changed into the preference mode, a screen 306 in which a previous channel is changed into new preference channel after key '2' has been input, and a screen 308 in which a previous channel is changed into new preference channel after the key '0' has been input, according to one embodiment of the present invention.

Referring to the key numbers registered in the remote controller 300, the key '1' corresponds to '9:KBS-1', the key '2' corresponds to '11:MBC', the key '3' corresponds to '6:SBS', the key '4' corresponds to '51:ABC' and the key '5' corresponds to '10:EBS' in the OSD screen 302 shown in the DTV system.

In addition, the key '6' corresponds to '82:NHN', the key '7' corresponds to '33:BBC', the key '8' corresponds to '40: AT News', the key '9' corresponds to 'KBS-2' and '0' corresponds to '74:CTN'.

Next, the user can change a current mode to a 'preference mode' in which a desired preference channel can be selected by inputting a corresponding key based on one-time-key-input (one-touch function) by the user (304).

In the changed preference mode, if the key '2' is input, then the current channel is immediately changed into the corresponding registered preference channel '11:MBC' as shown in the screen 306.

Similar to this, as shown in the screen 308, if the key '0' is input, the current screen is directly changed into '74:CTN' channel corresponding to the key '0'.

Figure 4:
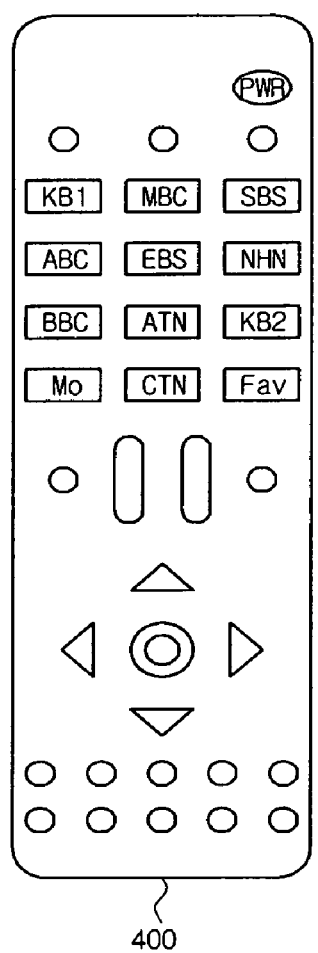
FIG. 4 is a structural view of a remote control device representing a registered state of preference channels in accordance with an embodiment of the present invention.
Figure 4:
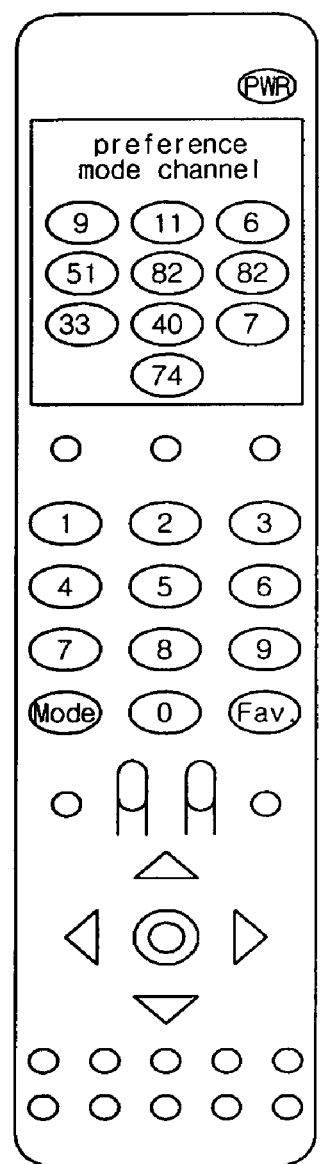

FIG. 4 is a view illustrating an example of a remote control device displaying a registered state of preference channels in accordance with an embodiment of the present invention.

Referring to FIG. 4, an exemplary view 400 of a remote controller displaying preference mode channels corresponding to the keys and an exemplary view 402 of a remote controller having an additional exclusive display unit representing a preference mode channel.

The embodiment of FIG. 4 provides a method in which the user may select the previously registered preference channels more easily and conveniently through the remote control keys which show the corresponding preference channels thereon, respectively to facilitate the user to immediately confirm what preference channel is pressed and selected in the remote controller level (a remote-controller-based confirmation).

Basically, if the user wants, preference channels represented on the remote controller can be also displayed and confirmed on an OSD of the DTV receiver, which, however, is more inconvenient to the user than the remote-controller-based confirmation mentioned above.

In order to solve this problem, it is required to continuously provide a preference channel information to the user through a remote controller. Therefore, the remote controller has to have a means for receiving and transmitting the information to and from the DTV receiver through bi-directional communication with the same protocol defined previously.

In the remote controller of the exemplary view 400, each key has a display unit for displaying thereon a symbol such as number, characters and mark indicating corresponding preference channel through which the user can easily and conveniently recognize what her/his now-input-key is.

Alternatively, display units may be disposed in the certain spaces around the corresponding keys of the remote controller, respectively.

In the meantime, as shown in the exemplary view 402, the remote controller may have thereon an additional dedicated channel display screen for displaying preference channels beside the key panel for general purposes.

In both cases of the views 400 and 402, the remote controllers can provides the symbols such as numbers, names or marks for indicating corresponding preference channels through the display units or the dedicated channel display screen. The user may select the kind of the symbols based on her/his taste.

Figure 1:
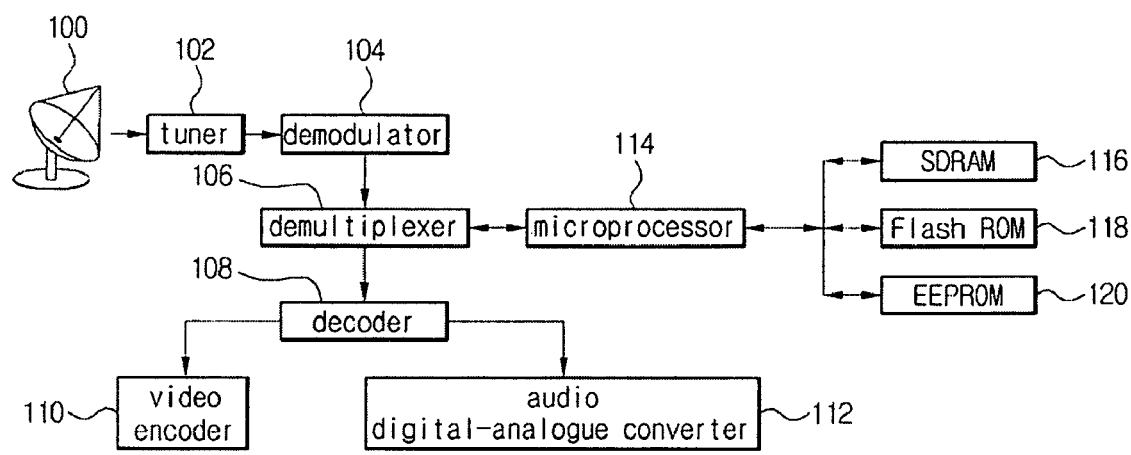
FIG. 1 is the structural view of a typical digital TV system according to a prior art.
Figure 5:
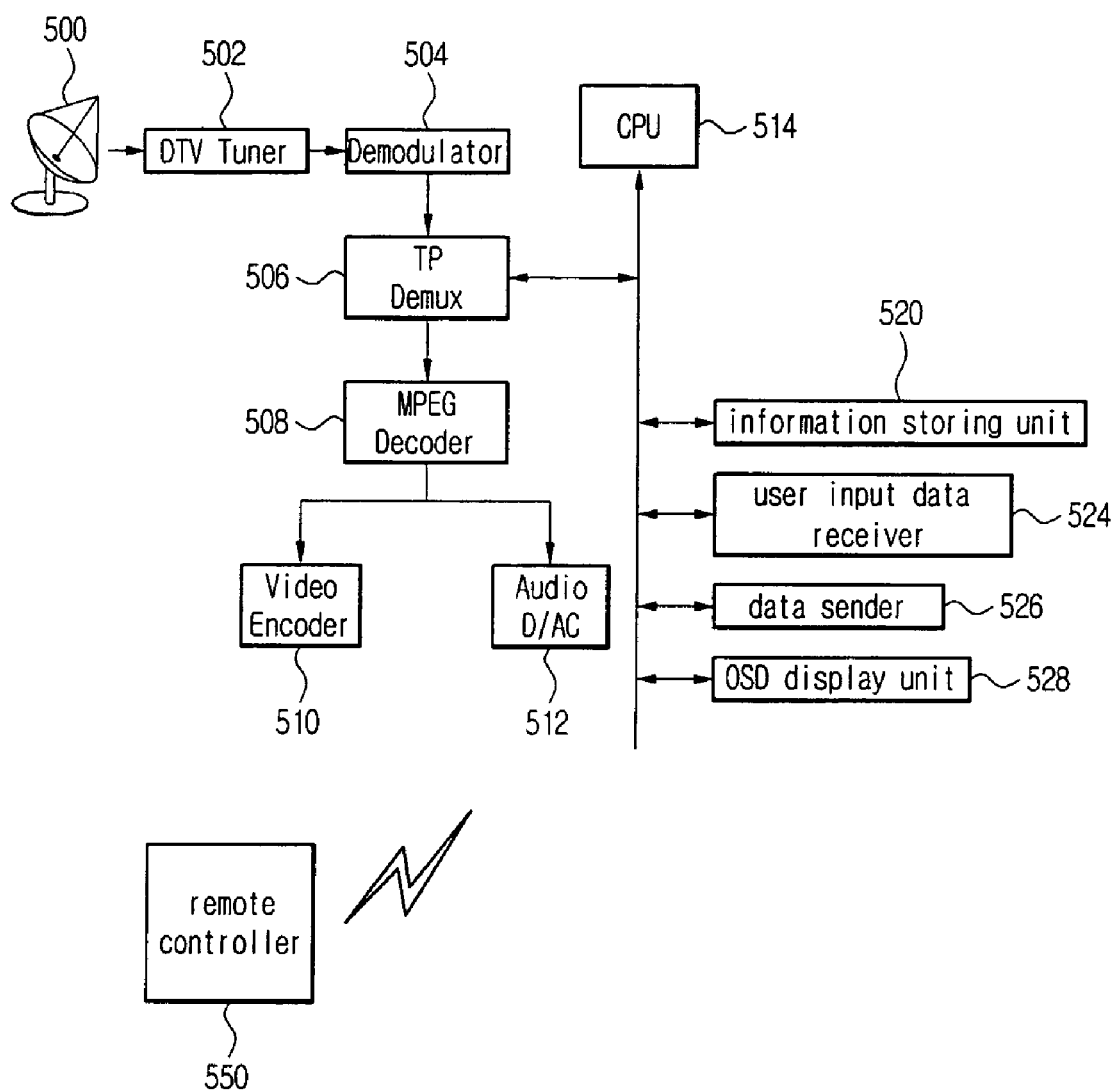
FIG. 5 is a structural view of a DTV system employing a method for selecting a preference channel in accordance with an embodiment of the present invention.

FIG. 5 shows a structural view of a DTV system having a channel selection function based on one-touch scheme according to one embodiment of the present invention. The structure of the DTV of the present invention in FIG. 5 is the same as that of the conventional DTV of FIG. 1 except that the DTV of the present invention has the information storing unit 520 instead of an SDRAM 116, a flash memory 118 and an EEPROM 120 of FIG. 1 and the DTV of present invention has an input receiver 524, a data sender 526, an OSD display unit 528 for registration and a channel selection. Therefore, the functions of the newly added portions will be mainly described referring to a process in FIG. 6.

Hereinafter, a description will be made about a method for selecting a preference channel in accordance with another embodiment of the present invention with reference to FIGS. 5, 6 and 6A.

Figure 6:
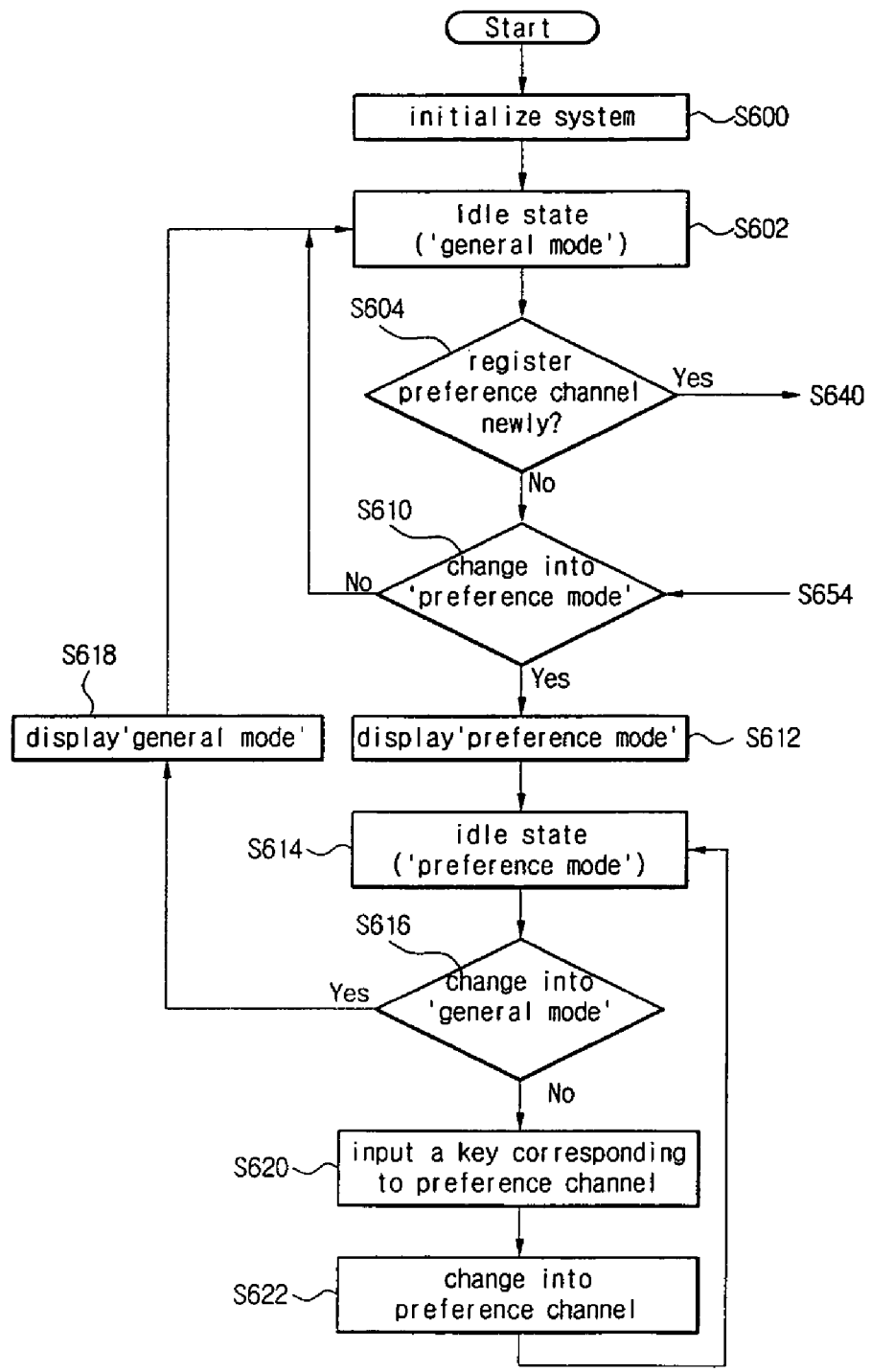
FIGS. 6 and 6A are flow charts illustrating a method for selecting a preference channel in accordance with another embodiment of the present invention.
Figure 6A:
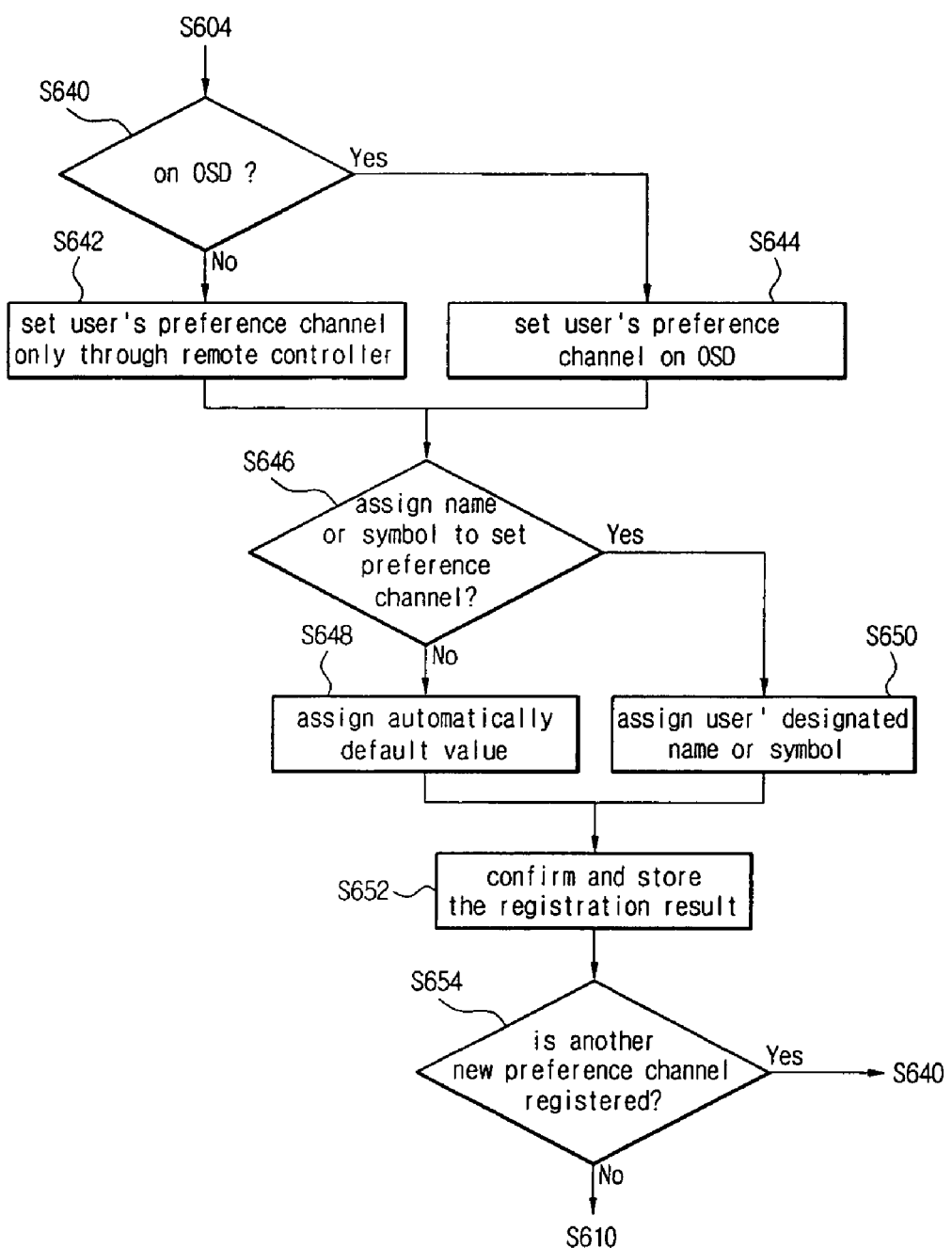

In the method for selecting the preference channel according to the present invention described in FIGS. 6 and 6A, the processes S602 through S622 are completely the same as those S206 through S208 of FIG. 2. Therefore, the description will include only a part of the whole process which are different from those in FIG. 2.

First, in the step S604, the DTV system determines if a preference channel is newly registered. In step S604, if there have been previously-registered preference channels or the preference channel is not newly registered, then the process goes to step S610 wherein the DTV system determines if the current mode is changed into the preference mode of one-touch type. If not, the process goes to step S640 wherein the DTV system determines if the new channel registration is performed on OSD. If the user wants to perform the new channel registration on OSD, then the remote controller 550 transmits an OSD-channel registration command to the input receiver 524. Then, the OSD display unit 528 provides the corresponding OSD screen for allowing the user to select and register the user's preference channels to the DTV system.

If the user's setting for registering the preference channel is not performed on the OSD in step S640, then the process goes to step S642 wherein the user sets the preference channels with only the remote controller. In this case, the user registers the preferred channels with only input keys in the remote controller 550 of DTV system, which, specifically, may be a preference channel-exclusive remote controller 400 or a remote controller 402 having both preference channel-exclusive keys and general remote control keys as shown in FIG. 4. When the user registers the desired preference channels with only the remote controller 550, the registered data for the preference channels is also stored in the information storing unit 520 through the user input data receiver 524 of the DTV system. After this, the user may select her/his preference channels with an one-touch key input at the preference mode state.

If the setting process for the preference channels has been finished on the OSD in step 644 or on the remote controller in step 642, the process goes to step 646 wherein the DTV system determines if the user want to assign a name or a symbol to a group of preference channels (hereinafter referring to as "a preference channel set"), which have been set in previous step 642 or 644 in order to distinguish the newly generated preference channel set from the old ones. If the user wants to, then the process goes to step 650 wherein the name or the symbol, which has been selected by the user, is assigned to the set of the preference channels. The assigned name may be, for example, personal name, or a word for indicating functions (for example, education, entertainment, animation, and etc.).

If the user does not want to assign the name or symbol to the set of the preference channels, then the process goes to step 648 wherein the controller (for example, CPU) 514 assign automatically a default value to the preference channel set to store the assigned default value to information storing unit 520.

The controller 514 confirms all the registering data mentioned above which, then, is stored in the information storing unit 520 (step S652). Next, in step 654 the DTV system determines if there is another registration process remained for additional new preference channel. If there is another registration process remained, then the process goes to step 640 and repeats step 640 to 654, whereas if there is not another registration process, then the process goes to step 610 and repeats the same process as that of FIG. 2 of which description will be omitted.

While the present invention has been described in connection with specific and preferred embodiments thereof, it is capable of various changes and modifications without departing from the spirit and scope of the present invention. It should be appreciated that the scope of the invention is not limited to the detailed description of the invention hereinabove, which is intended merely to be illustrative, but rather comprehends the subject matter defined by the following claims.

According to the present invention, under the multi-channel environment of the DTV system, the users can easily and conveniently perform the channel-selection function which is one of the most-frequently-used functions in DTV, based on one-touch-input keys which correspond to the user's preference channels, respectively.

What is claimed is:

1. A method for selecting preference channels comprising
    initializing a digital TV (DTV) system to set an idle state of a general mode which allows a channel to be selected through multi-stage-input procedures;
    registering a preference channel set including at least one preference channel through which a user most-frequently watches a DTV, wherein each registered preference channel of the preference channel set is assigned to each of specific keys of a remote control, respectively;
    switching the currently-operated general mode to a preference mode; and
    selecting one channel from the registered preference channel set through an one-touch input of an assigned specifie key of the remote control that corresponds to the one channel, in the switched preference mode.

2. The method as claimed in claim 1, further comprising assigning a broadcasting station's symbol or name to correspond to each channel of the registered preference channel set.

3. The method as claimed in claim 2, wherein the broadcasting station's symbol or name is represented on the remote controller.

4. The method as claimed in claim 2, wherein the broadcasting station's symbol or name is represented on an on screen display (OSD) of the DTV system.

5. The method as claimed in claim 1, further comprising repeating the of registration of the preference channel set in order to register a plurality of preference channel sets.

6. The method as claimed in claim 5, further comprising assigning a user's name or a channel function name with respect to each of the plurality of preference channel number sets.

7. The method as claimed in claim 6, wherein the user's name or the channel function name is represented on the remote controller.

8. The method as claimed in claim 6, wherein the user's name or the channel function name is represented on an on screen display (OSD) of the DTV system.

9. The method as claimed in claim 1, wherein the registering of the preference channel set is performed on an screen disblay (OSD) of the DTV system.

10. The method as claimed in claim 1, wherein the registering of the preference channel is performed through the remote controller.

11. A diaital TV (DTV) system comprising: a DTV main portion configured to receive digital broadcasting signals; and a wireless remote controller configured to allow a user to interface with the DTV main portion through bi-directional wireless communication, wherein the DTV main portion comprises:
    a user input data receiver configured to receive the user input data including the user's preference channel registration information from the wireless remote controller;
    an information storing unit configured to store a general channel setting mode (a general mode information) and a preference channel setting mode (a preference mode information), wherein the general mode is for selecting a channel with a plurality of keys sequentially input, whereas the preference mode is for selecting a channel with one-touch key input; and
    a data transmitter configured to output the general mode information and the preference mode information; and
    an on screen display (OSD) display unit configured to provide options for selecting one of the general mode and the preference mode and to register preference channels,
    wherein at least one preference channel is registered as a preference channel set through the preference mode in the manner that each channel of the registered preference channel set corresponds to each of remote control keys, respectively, and one channel of the registered preference channel set is selected with a one touch input key corresponding to the selected one channel.

12. The DTV system as claimed in claim 11, wherein the DTV system further comprises a device configured to assign a broadcasting station's symbol or name to correspond to the each channel of the registered preference channel set.

13. The DTV system as claimed in claim 12, wherein the broadcasting station's symbol or name is represented on the remote controller.

14. The DTV system as claimed in claim 12, wherein the broadcasting station's symbol or name is represented on an on screen display (OSD) of the OSD display unit.

15. The DTV system as claimed in claim 11, wherein the number of the preference channel set is plural.

16. The DTV system as claimed in claim 15, wherein the DTV system further comprises a device configured to assign the user's name or a channel function name with respect to each of a plurality of preference channel number sets.

17. The DTV system as claimed in claim 16, wherein the user's name or the channel function name is represented on the remote controller.

18. The DTV system as claimed in claim 16, wherein the user's name or the channel function name is represented on an on screen display (OSD) of the OSD display unit.

19. The DTV system as claimed in claim 11, wherein the registration of the preference channel set is performed on an on screen display (OSD) of the OSD display unit.

20. The DTV system as claimed in claim 11, wherein the registration of the preference channel is performed through the remote controller.

* * * * *